United States Patent Office 3,325,296
Patented June 13, 1967

3,325,296
ARTIFICIAL SWEETENING COMPOSITION AND METHOD OF PRODUCING THE SAME
Willard C. Braaten, Waukegan, Ill., assignor to Norse Chemical Corporation, Cudahy, Wis., a corporation of Wisconsin
No Drawing. Filed Jan. 18, 1965, Ser. No. 426,357
8 Claims. (Cl. 99—141)

ABSTRACT OF THE DISCLOSURE

A solution of a water soluble starch hydrolysate and a controlled amount of an artificial sweetener is vacuum dried to produce a cellular material which is then particulated into a free flowing product having the crystalline appearance and sweetness of granulated sugar.

---

This invention relates to a sucrose substitute or replacement and has as its purpose and object to provide a product consisting of an artificial sweetener—a cyclamate, for instance—combined with a bulking agent or extender, and which nevertheless has the crystalline appearance of ordinary granulated sucrose and, like sucrose, is capable of general use, including cooking and baking.

More specifically, it is an object of this invention to provide a sucrose substitute consisting of an artificial sweetener combined with a bulking agent, which in appearance and behavior in use is so similar to ordinary granulated sucrose as to be practically indistinguishable therefrom in these respects, which can be sold and used without violating the pure food laws, and which can be produced with substantially the same bulk density and caloric value as sucrose, or if desired with a bulk density and caloric value per unit of volume considerably less than that of sucrose.

Another object of this invention is to provide a sweetening agent that can be used in place of sucrose, which consists essentially of a bulking ingredient and an artificial sweetener, with the bulking agent constituting by far the major proportion of the whole, and in which the sweetness level of the product is determined solely by the amount of the artificial sweetener used and the selection thereof.

Another object of this invention is to provide a replacement or substitute for sucrose that can be produced and sold at a price realistically competitive with that of sucrose, and which utilizes as the source of its bulking ingredient or component, agricultural commodities that are produced in excess and are therefore readily available and inexpensive.

Previous attempts to produce a sucrose substitute have not resulted in a commercially acceptable product, primarily because because they were unable to yield a product which had the crystalline appearance and the behavior-in-use characteristics of ordinary granulated sucrose, to say nothing of the cost of producing the product. The best example of these prior efforts to produce a sucrose substitute is believed to be the Jucaitis et al. patent, No. 2,876,105, issued Mar. 3, 1959. But that patent is concerned with the production of a low caloric sweetener composition, and hence does not provide a true substitute for sucrose.

More important, though, is the fact that the material which forms the bulking agent or extender of the product described in that patent—namely, polyoses, and the method employed in the production of the product, precluded the obtension of a sweetner composition having the appearance and behavior-in-use characteristics of ordinary granulated sucrose—the attributes which are so essential to commercial acceptability.

As explained in the Durand patent No. 2,563,014, referred to in the Jucaitis et al. patent, polymerization is the key to the production of polyoses; and to effect the needed polymerization, catalysts are employed. These catalysts inevitably leave impurities in the final product. In the case of the glue or adhesives with which Durand was concerned, this residue may not have been objectionable, but in a food product they would produce undesirable contaminants, at least if the catalyst was boric acid or aluminum chloride.

Another important attribute of a commercially acceptable sweetener composition is good solubility. The sweetener composition of the Jucaitis et al. patent apparently was soluble only in hot water, and even then not without producing some cloudiness; and to achieve that degree of solubility and overcome the tendency to float upon the surface of a liquid, which is an inherent disadvantage of polyoses, a large proportion of rather costly gum arabic and several other additives had to be incorporated in the product. This, of course, added considerably to its cost, and would make the product too expensive for ordinary use.

In contrast, I have found that a sucrose substitute which in appearance and behavior-in-use characteristics is practically indistinguishable from sucrose, and which is inexpensive to produce, can be attained by combining certain artificial sweeteners with an aqueous solution of certain selected starch hydrolysates, and drying the resulting solution in a particular way. The starch hydrolysate constitutes by far the major proportion of the whole, actually more than ninety percent thereof, and hence is the bulking agent, diluent or extender of the new product.

There are, of course, many starch hydrolysates and many natural sources thereof, starch being found in a wide variety of agricultural commodities. But of all the almost limitless number of starch hydrolysates available, I have found that the only ones suitable for the production of my product are the conventional degradation products which result from ordinary acid or enzyme hydrolysis of starch, and in which the polysaccharides are readily soluble in water and consist primarily of trisaccharides and higher water soluble saccharides. The higher molecular weight hydrolysates have only limited solubility in water, and these therefore cannot be used; and the hydrolysates at the other end of the spectrum, i.e. those of low molecular weight, consisting of dextrose and maltose, though completely soluble in water, are too hygroscopic to be suitable.

One of the suitable starch hydrolysates is a corn syrup solid identified by the Corn Industries Research Foundation as "malto-dextrin." This is a conventional starch degradation product having a dextrose equivalent (D.E.) in excess of thirteen percent (13%) but not more than twenty-eight percent (28%). It is available in large supply and at relatively low cost, and it has virtually no discernible sweetness, so that the sweetness level of the finished product can be controlled by regulating the proportion of the artificial sweetner used.

The artificial sweetner that is added to or combined with the starch hydrolysate diluent is preferably any suitable salt of cyclo-hexylsulfamic acid—or, more simply, any of the cyclamates that can be used as artificial sweeteners. These salts can tolerate prolonged heating as encountered in baking and cooking, and since the starch hydrolysates that are used as the bulking agent are likewise tolerant of prolonged heating, the product of this invention is no more affected by heat than sucrose.

Salts of saccharin can be used to provide the sweetness if the end product is not intended for cooking or baking, but only for such purposes as table sweeteners or in sweetening compositions used in products not intended to be heated to temperatures involved in cooking or baking. Also for some purposes, it may be desirable to use combinations of cyclamates and salts of saccharin.

An important aspect of this invention is that in the production of the product the selected sweetener and the starch hydrolysate are combined in an aqueous solution. As a result, the sweetener and the hydrolysate become intimately and uniformly admixed. This solution is then dried and particulated. I have discovered that by exercising certain controls over the drying, the nature of the end product can be varied and predetermined. Thus it is possible, through control of the drying, to convert the same aqueous solution of starch hydrolysate and artificial sweetner either into a product having substantially the same density and crystalline appearance as sucrose, or into a product which has the same crystalline appearance and behavior-in-use characteristics as sucrose, but a greatly decrease bulk density, so that by adjusting the proportion of artificial sweetener used, the same level of sweetness as sucrose, but far less caloric value per unit of volume, will result.

To be more specific, if the starch hydrolysate-artificial sweetener solution is dried on an ordinary vacuum drum dryer, and the resulting flakes which are scraped from the drum are milled and classified, i.e. graded for particle size, the product will be practicially indistinguishable in appearance, taste and behavior-in-use characteristics from granulated sucrose, provided of course that the correct amount of sweetener is used. Its density and caloric value will be, or can be, made substantially the equivalent of sucrose.

On the other hand, if the solution is dried in a way which produces a cellular or porous structure so that each particle of the milled product has an irregular shape, and perhaps also some porosity the bulk density of the composition will be far less than that of sucrose, with the result that the caloric value per unit of bulk or volume will be less than that of sucrose, though its sweetness strength is equal to that of sucrose. I have discovered that controlled low temperature vacuum drying will produce this cellular or porous structure, and that one way of getting the needed control is to use the drying method known as lyophilization. In lyophilization the solution is placed in a container and frozen at a very low temperature into a cake, which is then transferred to a vacuum chamber where it is heated and dried.

If desired, additives such as gum acacia and gelatin and conventional stabilizers and preservatives may be incorporated in the solution before it is dried, to give the composition the benefits expected from their addition. The incorporation of a small amount of gum acacia and gelatin seems to improve the structural strength of the particulate product and hence minimizes attrition due to shipping and handling, an advantage which is especially important where the product is dried to a cellular or porous form with a view towards reducing its bulk density. Gum acacia and gelatin also tend to make the product less hygroscopic and enhance its crystalline appearance.

Although the foregoing more or less general description of the invention may be sufficient to enable those skilled in the art to make the product of this invention, to preclude any doubt, the following specific examples of the production of the product are included. All quantities stated these examples are by weight, and the malto-dextrin employed as the bulking agent in the majority of the examples, is a conventional starch hydrolystate product in the form of a water soluble polysaccharide starch hydrolysate derived from simple hydrolysis of corn starch and having a dextrose equivalent of between thirteen and twenty-eight percent (13–28%).

*Example 1*

Thirty parts of malto-dextrin and one part of sodium cyclamate, both in fine pulverulent form, were dissolved in twenty parts of water, by heating. The resulting syrupy solution was then dried by spreading it in a thin film onto the surface of a steam heated vacuum drum drier, in which the pressure was maintained at about 100 mm. Hg. This produced dry flakes which were scraped from the drum and particulated. The resulting product had the crystalline appearance and flowability of granulated sucrose, contained less than five percent moisture, and had approximately the same bulk density, caloric value and sweetness as granulated sucrose. When used as a sweetener for coffee or tea, either hot or cold, it gave no evidence of floating, but on the contrary quickly dissolved. Heat did not affect the product any more than it affects ordinary granulated sucrose.

*Example 2*

Forty parts of malto-dextrin and two parts of sodium cyclamate, both in fine pulverulent form, were dissolved in five parts of water by heating. This formed a syrupy soltion. One-half part of gum acacia was dissolved in ten parts of boiling water. The two solutions were combined and thoroughly mixed, and then dried in a vacuum drier, as in Example 1. The resulting product had the desired crystalline appearance of granulated sucrose, contained less than five percent moisture, and had approximately the same bulk density and caloric value as sucrose, but considerably greater sweetness.

*Example 3*

Forty parts of malto-dextrin and two parts of sodium cyclamate, both in fine pulverulent form, were dissolved in twenty-five parts of water by heating. The resulting syrupy solution was placed in a container to a depth of about one-half inch, and frozen at $-40°$ C. The frozen cake was then transferred to a vacuum chamber and exposed to a pressure of less than .1 mm. Hg and radiant heat of 70–80° F. for three hours. This reduced the moisture content of the material to less than five percent and gave it a cellular or porous structure.

The cellular-porous cake was then particulated, i.e. granulated, to a grain or particle size comparable to that of ordinary granulated sucrose. The resulting product appeared crystalline and because of the irregular shape of its individual particles, and perhaps also such porosity as the particles may have had, the product had a bulk density of approximately sixty percent (60%) that of ordinary granulated sucrose. On a volume basis, its sweetness strength was equivalent to that of sucrose and hence the caloric value of a given volume of the product was considerably less than an equal volume of sucrose.

*Example 4*

Everything in this fourth example was the same as in Example 3, except that a solution of one-half part gum acacia and one-tenth part of gelatin in ten parts of boiling water was added to and thoroughly admixed with the malto-dextrin and cyclamate solution. The appearance of the end product was slightly more crystalline than that of Example 3, and was less hygroscopic.

*Example 5*

The same ingredients and procedure set forth in Example 4 was followed in this fifth example, except that the artificial sweetner consisted of one-part sodium cyclamate and one-tenth part of sodium saccharin. The resulting product was slightly sweeter but not quite as stable against prolonged heat.

*Example 6*

One hundred parts of malto-dextrin in fine pulverulent form was dissolved in fifty parts of water, and mixed with a solution of four and one-half parts of sodium cyclamate in fine pulverulent form in ten parts of water. The resulting solution was then lyophilized, as in Example 2, and particulated. This produced a product that had the crystalline appearance of granulated sucrose, a bulk density seventy-five percent that of granulated sucrose, a caloric value approximately seventy-five percent that of sucrose, and a sweetness on a volume basis substantially equal to that of scurose.

*Example 7*

One-thousand parts of malto-dextrin in fine pulverulent form was dissolved in five hundred parts of water to form a first solution. Sixty parts of sodium cyclamate also in fine pulverulent form was dissolved in one hundred parts of water to form a second solution. A third solution was formed of ten parts of gum acacia in forty parts of water, and four and three-tenths parts of gelatin was dissolved in forty parts of water to form a fourth solution. These four solutions were combined and thoroughly mixed. The resulting mixture was then placed in trays in a vacuum chamber. The air was withdrawn from the chamber and at the same time the contents of the chamber were heated to about 50° C. This caused a foaming and a puffing of the material as the moisture was drawn from it. The degree of vacuum to which the chamber was evacuated was about 0.50 mm. Hg and the time involved was three hours. The material was then removed from the vacuum chamber and particulated by passing it through a 20 mesh screen.

The resulting particulate product had approximately a five percent moisture content, a bulk density one-half that of granulated sucrose, and a sweetness approximately the same as that of sucrose on a volume basis. Like all the products of all of the other examples, this product also had a crystalline appearance and the easy flowability of granulated sucrose.

*Example 8*

Five pounds of corn syrup solids was dissolved in 1000 cc. of water. The corn syrup solids, like the malto-dextrin used in the preceding examples, was a conventional starch hydrolysate derived from simple hydrolysis of corn starch, but having a dextrose equivalent of about forty percent. Another solution was prepared by dissolving 125 grams of sodium cyclamate in 150 cc. of water. A third solution was prepared in which ten grams of acacia and five grams of gelatin were dissolved in 100 cc. of water. The three solutions were combined and thoroughly mixed, cooled to room temperature and dried in a vacuum chamber. The dried material was particulated and had the appearance of granulated sucrose, but its density was only 43.3 percent that of sucrose. This product was more hygroscopic than the products of the aforesaid examples, and hence had to be kept in dry storage, or otherwise protected against humid conditions.

*Example 9*

100 grams of corn syrup of eighty percent solids concentration and having a dextrose equivalent of 26, was heated to 70° C. A solution of five grams of sodium cyclamate and 10 ml. water was added and mixed in thoroughly. The resulting syrupy solution was cooled and dried by heating in a high vacuum oven and particulated. The particulated material had the crystalline appearance of granulated sucrose and a density fifty-two percent that of sucrose.

*Example 10*

100 grams of malto-dextrin was dissolved in 50 ml. water by heating to 85°. C. Six-tenths of a gram ($6/10$) of saccharin sodium hydrate was dissolved in 4 ml. of water, and a third solution consisting of four-tenths ($4/10$) of a gram of acacia and one-tenth ($1/10$) of a gram of gelatin was dissolved in 10 ml. of boiling water. These individual solutions were combined, mixed and cooled to room temperature; and then low temperature vacuum dried, and particulated. The resulting product had the crystalline appearance of granulated sucrose and a density 78% that of sucrose.

Although the cyclamate used in each of the Examples 1–9, inclusive, was sodium cyclamate, calcium cyclamate could have been used in lieu thereof, and in fact was used in one run made in accordance with Example 2.

By the same token, a salt of saccharin can be used as the artificial sweetener in place of a cyclamate, as was done in Example 10.

While the foregoing specification describes several embodiments of the invention, those skilled in the art will understand that variations may be made therein without departing from the spirit of the invention and the scope of the appended claims.

What is claimed as my invention is:

1. The method of making a crystalline appearing sweetening composition which is suitable for use as a sucrose replacement, which method comprises:
    (A) forming an aqueous solution of a water soluble starch hydrolysate and an artificial sweetener chosen from the class consisting of suitable salts of cyclohexylsulphamic acid and of saccharin, with the artificial sweetener fraction of the solution being considerably less than the starch hydrolysate;
    (B) vacuum drying said solution to produce a dry cellular material; and
    (C) particulating that dry cellular material into particles of irregular shape to produce a product having the appearance and flowability of granulated sucrose.

2. The method of claim 1 wherein the water soluble starch hydrolysate is a cornstarch hydrolysate.

3. The method of claim 2 wherein the said cornstarch hydrolysate has a dextrose equivalent of between thirteen and twenty-eight percent.

4. The method of claim 1 further characterized by controlling the bulk density of the sweetening composition by selection of a subatmospheric pressure not substantially higher than about 100 mm. of mercury.

5. The method of making a crystalline-appearing prodduct suitable for use as a sucrose replacement, which method comprises:
    (A) preparing an aqueous solution of a water soluble corn starch hydrolysate and an artificial sweetener chosen from the class consisting of suitable salts of cyclohexylsulphamic acid and of saccharin;
    (B) freezing said aqueous solution into a solid cake;
    (C) transferring the frozen cake to a vacuum chamber;
    (D) while in the vacuum chamber subjecting the cake to a sufficiently high degree of vacuum and heat to convert the same into a dry cellular material;
    (E) removing the dry cellular material from the vacuum chamber; and
    (F) particulating said dry cellular material into particles of irregular shape to produce a product having the appearance and flowability of granulated sucrose.

6. The method of making a product suitable for use as a sucrose replacement, which method comprises:
    (A) preparing a solution of six parts of an artificial sweetener chosen from the class consisting of sodium cyclamate, calcium cyclamate and salts of saccharin, in corn starch hydrolysate containing one-hundred parts of water soluble carbohydrates;
    (B) placing the resulting solution in a vacuum chamber;
    (C) withdrawing air from the vacuum chamber and at the same time heating the material in the chamber to about 50° C. until the material acquires a dry cellular structure;
    (D) removing the dry cellular material from the vacuum chamber; and
    (E) passing the dry cellular material through a screen to form a particulate product having the crystalline appearance, flowability and sweetness of granulated sucrose and approximately fifty percent of the density and caloric value of sucrose.

7. A sucrose replacement produced by the process of claim 1.

8. A sucrose replacement produced by the process of claim 5.

References Cited

UNITED STATES PATENTS 3,170,800  2/1965  Pader et al. _____ 99—141

FOREIGN PATENTS 602,572  8/1960  Canada.
14,375  8/1963  Japan.

OTHER REFERENCES

Chambers, H. H.: "Vacuum Freeze Drying," in Manufacturing Chemist and Manufacturing Perfumer, 1949, XX, 2, pp. 75–77.

Cotson et al.: Freeze-Drying of Foodstuffs, Columbine Press, Ltd., Manchester and London, 1963, p. 109.

A. LOUIS MONACELL, *Primary Examiner*.

RAYMOND N. JONES, *Examiner*.

S. E. HEYMAN, *Assistant Examiner*.

Disclaimer and Dedication 3,325,296.—*Williard C. Braaten,* Waukegan, Ill. ARTIFICIAL SWEETENING COMPOSITION AND METHOD OF PRODUCING THE SAME. Patent dated June 13, 1967. Disclaimer and dedication filed Apr. 30, 1968, by the assignee, *Norse Chemical Corporation.*

Hereby disclaims and dedicates to the Public the terminal portion of the term of the patent subsequent to May 15, 1977.

[*Official Gazette June 11, 1968.*]